United States Patent [19]
Leonard

[11] Patent Number: 5,518,218
[45] Date of Patent: May 21, 1996

[54] SECURED UMBRELLA HOLDER STAND

[75] Inventor: Stephen S. Leonard, Ellicottville, N.Y.

[73] Assignee: The Last Stand (Umbrella Holder Company), Ellicottville, N.Y.

[21] Appl. No.: 290,132

[22] Filed: Aug. 15, 1994

[51] Int. Cl.$^6$ .................................................. F16M 13/00
[52] U.S. Cl. ........................... 248/530; 248/514; 248/538
[58] Field of Search .................................. 248/530, 532, 248/514, 519, 538, 518, 520, 515, 541, 542, 231; 297/188.2, 188.04, 188.01

[56] References Cited

U.S. PATENT DOCUMENTS

| | | | |
|---|---|---|---|
| 970,751 | 9/1910 | Pranke | 248/515 |
| 1,472,668 | 10/1923 | Oliver | 248/156 |
| 2,195,391 | 3/1940 | Hunter | 248/156 |
| 2,869,814 | 1/1959 | Hurlimann | 248/538 |
| 4,318,567 | 3/1982 | Guthier | 297/188.2 X |
| 4,522,300 | 6/1985 | Hamblet | 224/274 X |
| 4,789,200 | 12/1988 | Munguia | 297/188.20 X |
| 4,887,786 | 12/1989 | Stokes | 248/539 X |
| 4,974,807 | 12/1990 | Moineau | 248/539 |
| 5,269,157 | 12/1993 | Ciminelli et al. | 297/188.04 X |
| 5,390,884 | 2/1995 | Skoff et al. | 248/156 |

FOREIGN PATENT DOCUMENTS

| | | | |
|---|---|---|---|
| 670894 | 9/1963 | Canada | 248/530 |

*Primary Examiner*—Karen J. Chotkowski
*Attorney, Agent, or Firm*—Howard J. Greenwald

[57] ABSTRACT

A portable umbrella assembly comprised of a tube, an umbrella disposed within the tube, an umbrella support member, and three bungee cords attached around the tube. One of the ends of the tube is chamfered so that it can readily be inserted into the ground. A series of holes are drilled through the tube to receive a transversely-extending fastener insertable through the holes.

11 Claims, 3 Drawing Sheets

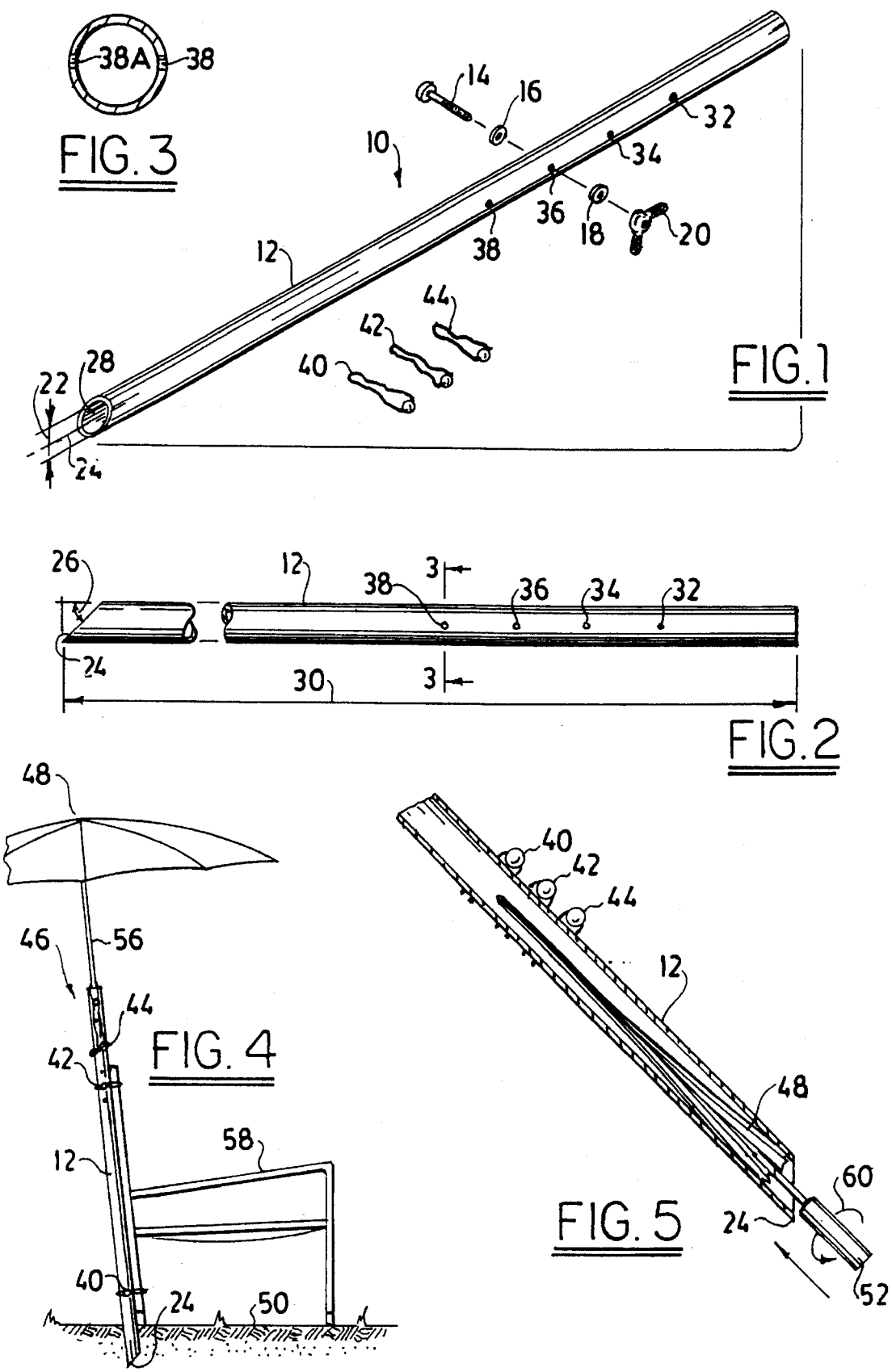

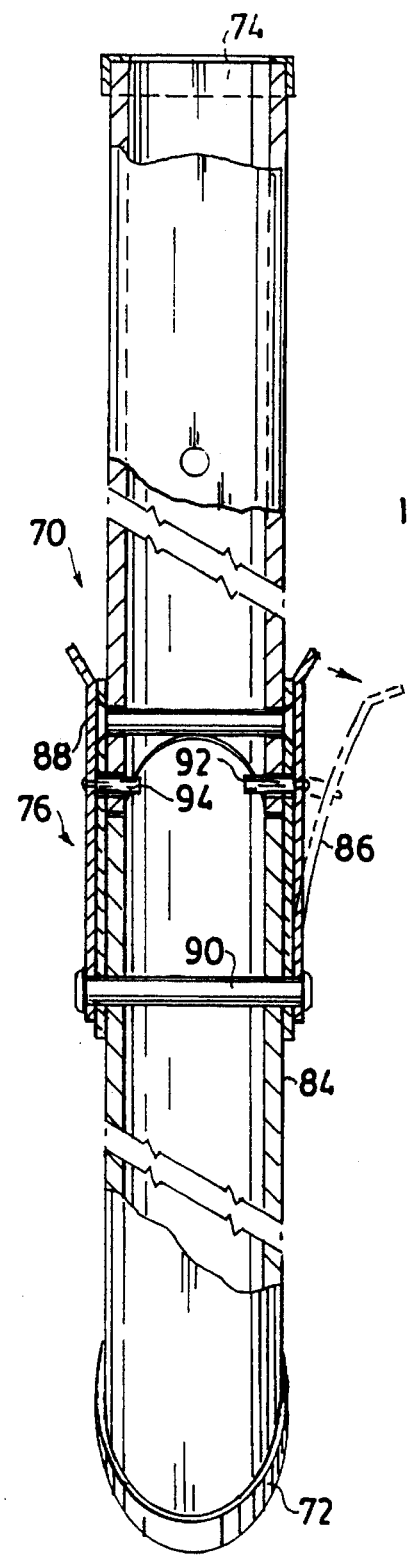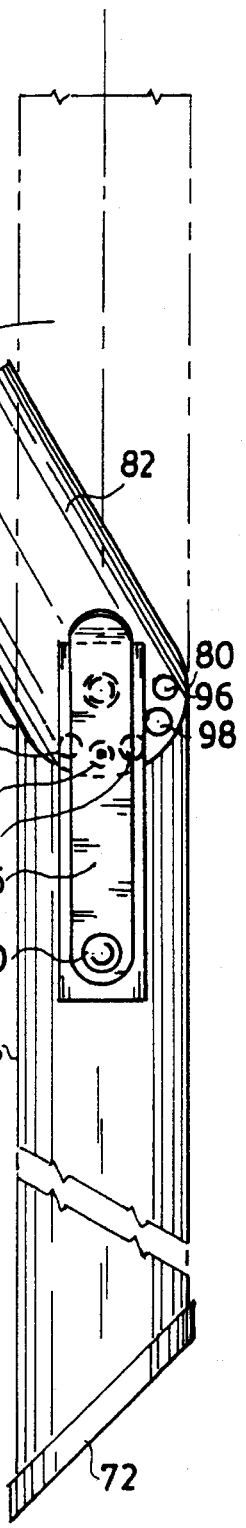
FIG.6   FIG.7   FIG.8

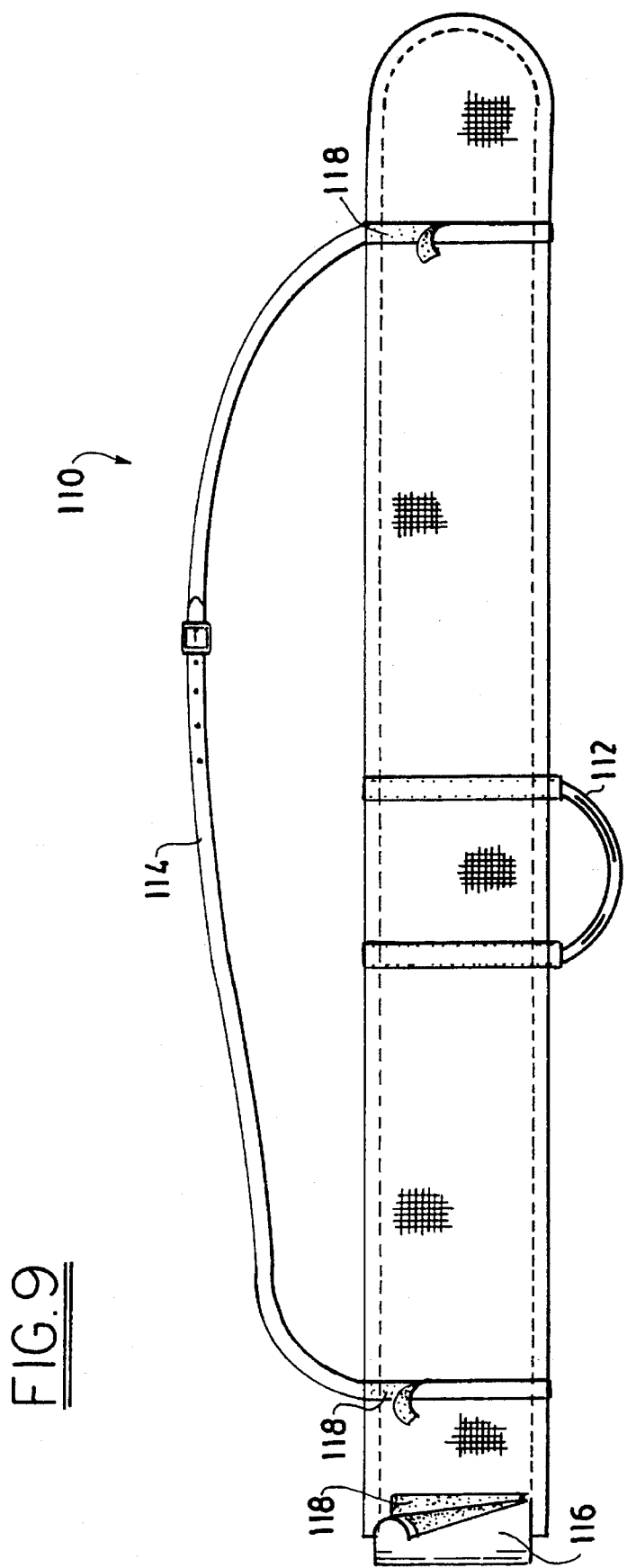

SECURED UMBRELLA HOLDER STAND

FIELD OF THE INVENTION

A portable stand which can be mounted in the ground and secured to a chair and which is adapted to receive and support an umbrella.

BACKGROUND OF THE INVENTION

For many occasions it is desirable to have a portable umbrella which can readily and securely be mounted to a chair or table. Thus, sun tanners at a beach, fans at a sporting event, campers, fisherman, and others can advantageously use such a device.

To the best of applicant's knowledge, however, no such device which is readily and easily usable is available. Beach umbrellas are available, but they are relatively large, cumbersome, and expensive; and they cannot readily be attached in ground that is hard to pierce. Furthermore, such beach umbrellas are not easy to store.

It is an object of this invention to provide an umbrella assembly which is portable, relatively lightweight, and relatively inexpensive.

It is another object of this invention to provide an umbrella assembly which can be mounted in or on the ground and secured to a chair, table, or other structure.

It is yet another object of this invention to provide an umbrella assembly in which the height of the umbrella disposed within the assembly may be adjusted.

SUMMARY OF THE INVENTION

In accordance with this invention, there is provided a portable umbrella assembly comprised of a tube, an umbrella disposed within the tube, and a multiplicity of ball bungee cords disposed around such tube. The tube has a beveled edge adapted to be driven into the ground. A multiplicity of orifices extend transversely through the tube; each set of them is adapted to receive an umbrella handle stop.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 1 is an exploded view of one preferred embodiment the tube used in the umbrella assembly of this invention;

FIG. 2 is a partial side view of the tube of FIG. 1;

FIG. 3 is a sectional view of the tube of FIG. 1;

FIG. 4 is a perspective view of the umbrella assembly of this invention, illustrating its use with a lawn chair;

FIG. 5 is sectional view of the tube of FIG. 1, illustrating how an umbrella may be stored in it;

FIG. 6 is front view of another preferred stand which may be used in the umbrella assembly of this invention;

FIG. 7 is a side view of the stand of FIG. 6, showing such stand in its vertical position;

FIG. 8 is a side view of the stand of FIG. 6, showing such stand in its diagonal position; and FIG. 9 is a pouch for transporting the stand of FIG. 1.

DESCRIPTION OF THE PREFERRED EMBODIMENTS

FIG. 1 an exploded view of the preferred stand 10 which is preferably used in the umbrella assembly of this invention. Referring to FIG. 1, it will be seen that stand 10 is comprised of pipe 12, machine screw 14, flat washer 16, flat washer 18, and wing nut 20.

In the preferred embodiment illustrated in FIG. 1, pipe 12 is comprised of a substantially circular inner chamber 22. As will be apparent to those skilled in the art, the circular shape of such inner chamber 22 is well adapted to receive handles of umbrellas which also are substantially circular in shape. As will also be apparent to those skilled in the art, different shaped chambers can be used for differently shaped umbrella handles. Thus, e.g., the orifice extending through pipe 12 may be substantially rectangular in cross-sectional shape, or oblique, or triangular, or irregularly shaped. What is important, however, is that the maximum dimension of the orifice be from about 0.5 to about 3.0 inches.

In the preferred embodiment illustrated in FIG. 1, pipe 22 has a substantially cylindrical shape and is comprised of a substantially cylindrical orifice 22. In this embodiment, the inner diameter of pipe 22 will range from about 0.5 to about 2.5 inches and, more preferably, from about 0.5 to about 1.5 inches.

As will be apparent to those skilled in the art, pipe 12 can be constructed from commercially available tubing. Thus, e.g., one may use a ten-foot section of Schedule 40, 2 inch nominal 1.5 inch inner diameter polyvinyl chloride pipe which is commonly available from most large hardware stores.

Referring again to FIG. 1, and also to FIG. 2, it will seen that, in the preferred embodiment depicted, tube 12 has a chamfered edge 24 which facilitates the insertion of tube 12 into the ground. Referring to FIG. 2, it will be seen that chamfered edge 24 preferably forms an angle 26 of from about 15 to about 75 degrees and, preferably, from about 30 to about 60 degrees. In one embodiment, angle 26 is from about 40 to about 50 degrees.

Referring again to FIG. 1, pipe 12 can be made from any type of plastic, wood, metal, or synthetic pipe which is now readily commercially available. In one preferred embodiment, pipe 12 consists essentially of plastic.

In one embodiment, pipe 12 consists essentially of polyvinyl chloride. Polyvinyl chloride pipe is readily commercially available and is well known to those skilled in the art. Thus, such pipe is disclosed in U.S. Pat. Nos. 5,072,972, 5,072,828, 5,056,448, 4,936,709, 4,930,754, and the like. The disclosure of each of these patents is hereby incorporated by reference into this specification.

Referring again to FIG. 1, and in the preferred embodiment illustrated therein, it is preferred that the pipe 12 have a wall thickness 28 of at least about 0.125 inches. It is preferred that thickness 28 be from about 0.2 to about 0.5 inches.

Referring to FIG. 2, and in the preferred embodiment illustrated therein, it is preferred that tube 12 have a length 30 which is at least about 24 inches and preferably ranges from 36 to about 72 inches. In one especially preferred embodiment, length 28 is from about 36 to about 48 inches.

Referring again to FIG. 1, it will be seen that orifices 32, 34, 36, and 38 extend through pipe 12; as will be apparent to those skilled in the art, comparable orifices (not shown) exist on the other side of pipe 12 so that machine screw 14 can be inserted through any one of four sets of such orifices.

As will be apparent to those skilled in the art, the extent to which the handle (not shown) of an umbrella (not shown) may be inserted within orifice 22 will depend upon which set of orifices the machine screw 14 is inserted through.

Referring again to FIG. 1, it will be seen that stand 10 is also comprised of ball bungee cords 40, 42, and 44 whose use will be discussed with reference to FIG. 4. Bungee cords are well known to those skilled in the art and are described, e.g., in U.S. Pat. Nos. 5,094,462, 5,069,440, 5,025,964, 5,007,675, 4,993,366, 4,989,877, 4,973,361, 4,971,082, and the like. The entire disclosure of these patents is hereby incorporated by reference into this specification.

In the embodiment depicted in FIG. 1, the bungee cords used are ball bungees, each of which is comprised of a bungee cord and a plastic ball. As is known to those skilled in the art, these ball bungees may be purchased from manufacturers of canopies, tents, and the like.

FIG. 3 is a sectional view of pipe 12. Referring to FIG. 3, it will be seen that orifice 38A is substantially aligned with orifice 38 so that machine screw 14 may be inserted through such orifices to provide an impediment to any umbrella handle (not shown) pushed against it.

FIG. 4 is side view of an umbrella assembly 46 which is comprised of an umbrella 48 disposed within pipe 12.

As is known to those skilled in the art, an umbrella is a device for protection from the weather consisting of a collapsible canopy mounted on a central rod. Any of the collapsible umbrellas known to those skilled in the art may be used in applicant's invention. Thus, e.g., one may use the umbrellas disclosed in one or more of U.S. Pat. Nos. 5,078,166, 4,934,395, 4,828,321, 4,821,756, 4,685,482, 4,607,653, 4,456,023, 4,201,237, 4,132,236, and the like. The entire disclosure of each of these patents is hereby incorporated by reference into this specification.

Referring again to FIG. 4, it will be seen that chamfered edge 24 of pipe 12 may be driven into the ground 50 by conventional means such as, e.g., a hammer (not shown) or any heavy flat object (not shown). Thereafter, the umbrella handle 52 (not shown in FIG. 4, but see FIG. 5) may be inserted into end 54 of pipe 12 until it is stopped by machine bolt 14 (not shown). Thereafter, bungee cord 44 may be wrapped around the shaft 56 of umbrella 48 and secured over wing nut 20, thereby removably attaching the umbrella 48 to pipe 12.

The pipe 12 may then be attached to a structure such as chair 58 by means of bungee cords 40 and 42.

When one is finished using umbrella assembly 46, the bungee cords 40 42, and 44 may be removed and reattached to stand 10 (see, e.g., FIG. 5), the umbrella 48 may be collapsed and compressed in conventional manner, and the umbrella 48 may then be inserted into the pipe 12 in the manner illustrated in FIG. 5 by, e.g., rotating the umbrella 48 in the direction of arrow. The umbrella can then be readily and easily stored within such pipe 12.

FIG. 6 is a front view of another preferred stand 70. Referring to FIG. 6, and also to FIGS. 7 and 8, it will be seen that stand 70 is preferably comprised of protective edge covers 72 and 74, which extend over the top edge and the bottom edge of pipe 12 and protects them during impact Referring again to FIGS. 6, 7, and 8, and in the preferred embodiment illustrated therein, it will be seen that stand 70 is a two-piece assembly comprised of a top portion, a bottom portion, and means for changing the angle formed between said top portion and said bottom portion.

An adjustable hinge assembly 76 provides one such means of varying the angle between top portion and the bottom portion. Referring to FIG. 7, it will be seen that, in this embodiment, pipe 12 is cut in a half moon configuration between points 78 and 80 so that top portion 82 of pipe 12 may be rotated while in contact with bottom portion 84 of pipe 12; FIG. 8 illustrates the positions of portions 82 and 84 after a specified degree of such rotation.

Referring again to FIGS. 6–8, attached to portion 84 of pipe 12 is a first hinged latch 86 and a second hinged latch 88, each of which is secured by rivet 90. Each of latches 86 and 88 is attached to a pin, such as pins 92 and 94, respectively.

Referring to FIGS. 6 and 7, top portion 82 of pipe 12 is comprised of a multiplicity of orifices 96, 98, 100, 102, and 104 into which pin 92 or pin 94 may be inserted.

In the operation of the stand 70, latches 86 and 88 may be pulled away from orifices 96 et seq. and, thereafter, top portion 82 may be moved to its desired position. When it has reached its desired position, latches 86 and 88 are moved towards orifices 96 et seq. until pins 92 and 94 are inserted into the orifices closest to the desired position. By this means, the portion 82 may be locked into place at the desired angular position, and the umbrella may thereafter be inserted into it.

FIG. 9 is a side view of stand carrier 110 which can be used to carry either stand 10 and/or the umbrella assembly 46. Referring to FIG. 9, it will be seen that carrier 110 is comprised of handle 112, shoulder strap 114, and flap 116 comprised of VELCRO fastener material 118. It will be seen that shoulder strap 114 also may be secured to, or removed from, the carrier 110 by means of VELCRO fastener material 118

Construction of the preferred umbrella stand

Means for constructing the preferred construction stand of this invention are presented below.

The materials used in this construction include: (1) a ten foot section of Schedule 40, 2" nominal, 1.5 inch inner diameter polyvinyl chloride pipe, (2) a $^{10}\!/\!_{24}{\times}2.5$" common, steel, nickel-plated machine screw, (3) a $^{3}\!/\!_{16}$"×24 common, steel, nickel-plated wing nut, (4) three 5", elastic stretch type ball bungee cords, (5) one can of acetone cleaning solvent, (6) one pair of protective rubber gloves, and (7) one package of cleaning rags, or paper towels.

Most of these materials can be purchased from any large hardware store. The ball bungee cords may be purchased from a canopy or tent manufacturing company.

The tools required to construct the umbrella assembly include (1) an electric miter saw with a cross-cut carbide blade, (2) a 25 foot, retractable, spring-loaded measuring tape, (3) a medium lead, #6, marking pencil, (4) an electric drill press, (5) a ¼", heavy duty, high carbon steel drill bit, and (6) a 3' straight edge.

The ten-foot section of polyvinyl chloride pipe may first be squared by cutting one of its ends at a 90 degree angle. Thereafter, one may measure 48 inches from the squared top of the pipe to its other end, and then the other end can be cut at a 45 degree angle with the electric miter box saw.

Thereafter, the height adjustment holes may be drilled into the polyvinyl chloride pipe at 8", 12", 16", and 20" from the top of the squared end.

Thereafter, the polyvinyl chloride pipe can then be cleaned with a rag saturated with acetone solvent. Then the bungee cords, and the machine screw and associated hardware, can be attached to the pipe.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A portable umbrella assembly comprised of a hollow tube, an umbrella adapted to be substantially entirely disposed within said hollow tube, an umbrella support member, a first ball bungee cord disposed around said hollow tube, a second ball bungee cord disposed around said hollow tube, and a third ball bungee cord disposed around such hollow tube, wherein:

(a) said hollow tube is comprised of a proximal end and a distal end, wherein said proximal end has a chamfered edge;

(b) said hollow tube is comprised of a first orifice longitudinally extending from said proximal end to said distal end of said hollow tube, a second transversely extending orifice, a third transversely extending orifice, a fourth transversely extending orifice, and a fifth transversely extending orifice, wherein:

1. said second transversely extending orifice and said third transversely extending orifice are substantially aligned with each other on a first side of said hollow tube,
2. said fourth transversely extending orifice, said fifth transversely extending orifice are substantially aligned with each other on a second side of said hollow tube,
3. said umbrella support member is disposed within one of said second transversely extending orifice and said third transversely extending orifice,
4. said chamfered edge of said proximal end is a substantially straight surface and is beveled at an angle of from about 30 to about 60 degrees, and
5. said hollow tube has a length of from about 36 to about 48 inches and has a wall thickness of from about 0.125 to about 0.5 inches.

2. The umbrella assembly as recited in claim 1, wherein said umbrella support member is comprised of a machine screw.

3. The umbrella assembly as recited in claim 1, wherein said umbrella support member is comprised of a wing nut.

4. The umbrella assembly as recited in claim 1, wherein said tube comprises a substantially circular inner chamber.

5. The umbrella assembly as recited in claim 1, wherein said inner chamber has a diameter of from about 0.5 to about 3.0 inches.

6. The umbrella assembly as recited in claim 5, wherein said inner chamber has a diameter of from about 0.5 to about 1.5 inches.

7. The umbrella assembly as recited in claim 1, wherein said tube consists essentially of polyvinyl chloride.

8. The umbrella assembly as recited in claim 1, wherein said tube has a wall thickness of at least about 0.125 inches.

9. The umbrella assembly as recited in claim 1, wherein said tube has a wall thickness of from about 0.2 to about 0.5 inches.

10. The umbrella assembly as recited in claim 1, wherein said umbrella is a collapsible umbrella.

11. The umbrella assembly as recited in claim 1, wherein said tube is comprised of a top edge cover and a bottom edge cover.

* * * * *